(12) United States Patent
Schillo et al.

(10) Patent No.: US 8,987,368 B2
(45) Date of Patent: Mar. 24, 2015

(54) POLYMERS BASED ON GRAFTED POLYOLEFINS

(71) Applicants: Simone Schillo, Ludwigshafen (DE); Roelof van der Meer, Halsteren (NL)

(72) Inventors: Simone Schillo, Ludwigshafen (DE); Roelof van der Meer, Halsteren (NL)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/671,156

(22) Filed: Nov. 7, 2012

(65) Prior Publication Data

US 2013/0116374 A1    May 9, 2013

Related U.S. Application Data

(60) Provisional application No. 61/557,434, filed on Nov. 9, 2011.

(51) Int. Cl.
   C08F 285/00   (2006.01)
   C08L 51/06    (2006.01)
   C08G 81/02    (2006.01)

(52) U.S. Cl.
   CPC .............. C08F 285/00 (2013.01); C08L 51/06 (2013.01); C08G 81/021 (2013.01)
   USPC .............................................. 524/504; 525/74

(58) Field of Classification Search
   CPC ................................ C08F 285/00; C08L 51/06
   USPC .......................................... 524/504; 525/74
   See application file for complete search history.

(56) References Cited

U.S. PATENT DOCUMENTS

| | | |
|---|---|---|
| 4,528,329 A | 7/1985 | Inoue et al. |
| 6,884,851 B2 | 4/2005 | Gauthy |
| 2004/0138381 A1 | 7/2004 | Blasius, Jr. et al. |
| 2005/0261422 A1 | 11/2005 | Ton-That et al. |
| 2012/0016090 A1 | 1/2012 | Loos et al. |

FOREIGN PATENT DOCUMENTS

| | | |
|---|---|---|
| CA | 2243697 | 8/1997 |
| EP | 0 269 275 A2 | 6/1988 |
| EP | 0 443 346 A2 * | 8/1991 |
| EP | 0443346 A2 * | 8/1991 |
| WO | WO 97/30112 A1 | 8/1997 |
| WO | WO 00/26286 A1 | 5/2000 |

OTHER PUBLICATIONS

CN 101955608A—machine translation—Published Jan. 26, 2011.*

* cited by examiner

*Primary Examiner* — Ling Choi
*Assistant Examiner* — Ronald Grinsted
(74) *Attorney, Agent, or Firm* — Oblon, McClelland, Maier & Neustadt, L.L.P.

(57) ABSTRACT

The present invention relates to a polymer (P1) obtainable by reaction of at least one component a) with at least one component b), wherein
a) is at least one polyolefin (A), which is grafted with at least one compound (G), and
b) is at least one compound (B) containing at least two epoxy groups.

23 Claims, 1 Drawing Sheet

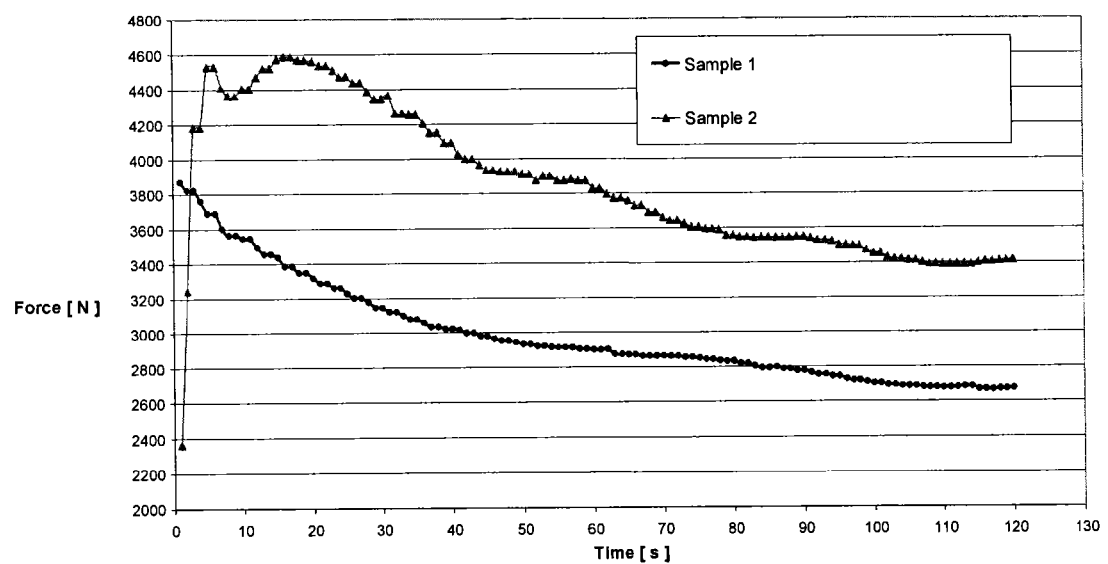

POLYMERS BASED ON GRAFTED POLYOLEFINS

This patent application claims the benefit of U.S. provisional patent application Ser. No. 61/557,434 filed on Nov. 9, 2011, incorporated in its entirety herein by reference.

The present invention relates to a polymer (P1) obtainable by reaction of at least one grafted polyolefin with a compound containing at least two epoxy groups. The present invention relates further to a composition containing said polymer (P1) and at least one further polymer (P2). Preferably, said composition is processed. The present invention also relates to a process for producing the polymer (P1) and to a process for producing the composition containing the polymer (P1) and the polymer (P2). In addition, the present invention relates to the use of said polymer (P1) to reduce the melt flow rate (MFR), in particular in recycled polyolefins.

Polyolefins, in particular polypropylene (PP), are a well-known class of polymers which can be employed in many different fields. An advantage of polyolefins is that products made out of polyolefins can be recycled. However, the loss of molecular weight of polyolefins, in particular of recycled polyolefins, during processing of the polyolefins is a well-known problem. The loss of (molecular) weight leads to a reduced melt strength (by consequence, an increased melt flow rate is measured) within the items made from polyolefin during processing, in particular by extrusion applications. The processing problem of polyolefins with an increased melt flow rate has already been addressed in literature.

WO 00/26286 relates to a process for modifying the molecular weight of polyolefins and to a composition comprising a polyolefin and multifunctional epoxides. The molecular weight of the polyolefins is modified by adding at least one compound (A), which contains at least one epoxy group and at least one alkenyl group. Furthermore, a radical former, such as a peroxide, and/or perchlorates are added in addition to compound (A). Disadvantages of said method are uncontrolled side reactions due to chain breaking and/or gel formation due to crosslinking, which effects are mainly caused by employing peroxides and/or perchlorates.

WO 97/30112 relates to a process for stabilizing polyolefin recyclates, to a stabilizer mixture and to a recycled polyolefin obtainable by said process. The polyolefin recyclate is stabilized against oxidative, thermal or light-induced degradation by adding at least one secondary aromatic amine and at least one polyfunctional epoxide to the polyolefin recyclate.

U.S. Pat. No. 6,884,851 relates to a process for producing polyolefins having special rheological and compatibilization properties, as well as to the resulting polyolefins and to their use. The polyolefins obtained by said process are grafted polyolefins, which show different melt strength properties compared to polyolefins, which are not grafted. The polyolefins to be grafted may be homo- or copolymers based on linear olefins containing from 2 to 8 carbon atoms, such as ethylene, propylene or 1-octene. The grafting is carried out with graftable monomers bearing at least one functional group chosen from a carbonyl and an acid anhydride and having a vinyl-unsaturated group. However, the grafted polymers according to U.S. Pat. No. 6,884,851 are not reacted further after the grafting.

EP-A 0 269 275 relates to a thermoplastic elastomer composition having an excellent heat bondability to various resins and metals and having a high rubbery elasticity and a good moldability. Said thermoplastic elastomer composition comprises a) a peroxide-crosslinking olefin copolymer rubber, b) an olefinic plastic and c) less than 10% compared to the amount of components a) and b) of an unsaturated epoxy monomer or an unsaturated hydroxyl monomer. Said thermoplastic elastomer composition is partially crosslinked. The rubber component a) does not contain any grafted olefin. The unsaturated epoxy monomer may be, for example, glycidyl esters of unsaturated monocarboxylic acids such as glycidyl acrylate or glycidyl methacrylate. The composition is produced by blending said components and dynamically heat-treating the blend in the presence of an organic peroxide to obtain partial crosslinking.

US-A 2004/0138381 relates to chain extenders made from epoxy-functional monomers, polymeric compositions and articles made therefrom. The chain extender comprises a polymerization product of a) at least one epoxy-functional (meth)acrylic monomer and b) at least one styrenic and/or (meth)acrylic monomer. Said chain extender has to fulfill further parameters, such as an epoxy equivalent weight of from about 180 to about 2800. Said chain extender can be employed in a chain extended polymeric composition comprising (besides said chain extender) at least one condensation polymer. Within said composition at least a portion of said chain extender has reacted with a portion of said condensation polymer to produce a chain-extended condensation polymer. Condensation polymers to be employed are selected from, for example, polyesters, polyamides or polyurethanes.

There is still a big market interest in a robust technology that enables to decrease the melt flow rate in polyolefins, in particular in recycled polyolefins such as recycled polypropylene or polyethylene. The problem underlying the present invention consists in the provision of novel polyolefins. Said novel polyolefins should be able to reduce the melt flow rate when employed in (different) polymers, in particular in (recycled) polyolefins.

According to the present invention, the object is achieved by a polymer (P1) obtainable by reaction of at least one component a) with at least one component b), wherein
a) is at least one polyolefin (A), which is grafted with at least one compound (G), and
b) is at least one compound (B) containing at least two epoxy groups.

A big advantage of the present invention can be found by employing a grafted polyolefin as component a) to obtain the polymer (P1). Due to the grafting and the maintained functionality, chain extension can be obtained via a straight forward reaction way resulting in stable bondings of compound (B) to the polyolefin of component a). Since compound (B) contains at least two epoxy groups, at least two (individual) grafted polyolefins according to component a) can be linked together. By consequence, a new and stable polymer (P1) is obtained having a significant increase in molecular weight compared to an ordinary polyolefin, which is not grafted. In addition, the torque of the new polymer (P1) is increased compared to a conventional polymer according to component a).

An additional advantage of the polymer (P1) compared to (recycled) polyolefins as described in, for example, WO 00/26286 is that no free radical initiators are employed when preparing the polymer (P1) by reacting at least one component a) with at least one component b). The method according to WO 00/26286 requires the employment of free radical initiators (radical formers such as peroxides), otherwise the multifunctional epoxides cannot be connected to the polyolefins. However, no controlled built up of polyolefins with an increased molecular weight can be obtained by this method according to WO 00/26286, but only by employing grafted polyolefins according to the present invention. By consequence, no or drastically reduced uncontrolled side reactions due to chain breaking and/or gel formation due to crosslinking can be found within the polymers (P1) according to the present invention.

The polymers (P1) according to the present invention can be successfully employed together with different polymers, especially with polyolefins, in particular with recycled polyolefins. Due to the stable bonding and, by consequence, the controlled built up of high molecular weight polyolefin according to polymer (P1) of the present invention, the molecular weight decrease of polyolefins, especially recycled polyolefins obtained by processing, can be compensated. This means that the quality/the properties of recycled polyolefins can be significantly increased by adding at least some amount of the novel polymer (P1) having an increased molecular weight compared to ordinary polyolefin, which is not grafted and/or not chain-extended.

BRIEF DESCRIPTION OF THE DRAWING

FIG. 1 is a graph showing torque versus time of Sample 1 and Sample 2 in Example 2.

The present invention is specified further hereinafter.

First, the polymer (P1) obtainable by reaction of the components a) and b) is defined in more detail. A composition containing at least one polymer (P1) and at least one further polymer (P2) as well as methods for preparing said polymer (P1) or said compositions containing said polymers (P1) and (P2) are defined afterwards in the text below.

The component a), which is used for obtaining a polymer (P1), comprises at least one polyolefin (A), which is grafted with at least one compound (G). The polyolefin (A) as such (without consideration of compound (G)) may be any polyolefin known to a person skilled in the art, which is not grafted. Suitable polyolefins to be employed as polyolefin (A) are described, for example, in WO 00/26286. The polyolefins can be prepared, for example, by radical polymerization or catalytic polymerization. The polyolefin may be a homopolymer or a copolymer based on at least two different olefins. Preferably, the polyolefin (A) is a polymer based on (at least one) linear olefins containing from 2 to 8 carbon atoms, such as ethylene, propylene, 1-butene, 1-pentene, 1-hexene and 1-octene. In case of copolymers, in particular of copolymers of polypropylene, the comonomers are additionally (to the above linear olefins) chosen from 4-vinylcyclohexene, dicyclopentadiene, methylene and ethylidene norbornene, 1,3-butadiene, isoprene and 1,3-pentadiene.

More preferably, the polyolefin (A) is selected from polypropylene (PP), PP-copolymers, polyethylene (PE), or metallocene based polyolefins. Polyethylene is preferably low density polyethylene (LDPE), linear low density polyethylene (LLDPE), or high density polyethylene (HDPE). The PP copolymer and the metallocene based polyolefins are based on the same monomers as described in the previous paragraph, last two sentences. Most preferably, the polyolefin (A) of component a) is polypropylene (PP) or polyethylene (PE).

The compound (G), which is grafted onto at least one polyolefin (A), may be any compound known to a person skilled in the art known to be useful for being grafted on polyolefins. Said compound (G) has at least one functional group, which is still present after being grafted onto at least one polyolefin (A). In addition, said functional group is able to react with an epoxy group of compound (B) as described below. Such compounds are described, for example, in U.S. Pat. No. 6,884,851. Preferably, compound (G) may be a graftable monomer bearing at least one functional group chosen from a carbonyl and an acid anhydride. Examples for such graftable monomers are unsaturated monocarboxylic or dicarboxylic acids and derivatives thereof and unsaturated monocarboxylic or dicarboxylic acid anhydrides and derivatives thereof. The graftable monomer according to compound (G) preferably contains from 3 to 20 carbon atoms.

In addition, further graftable monomers may be employed as a mixture together with at least one compound (G). Said further graftable monomers bear a vinyl unsaturated group and, optionally, one or more aromatic rings. As typical examples, mention may be made of 1-dodecene, styrene, vinylpyridine, divinylbenzene, 1,4-hexadiene and mixtures thereof. From these further graftable monomers styrene is most particularly preferred.

More preferably, the compound (G) of component a) is one compound selected from acrylic acid, methyacrylic acid, maleic acid, fumaric acid, itaconic acid, crotonic acid, citraconic acid, maleic anhydride, itaconic anhydride, crotonic anhydride or citraconic anhydride. Most preferably, the compound (G) of component a) is maleic anhydride.

Methods for grafting polyolefins to obtain a compound a) according to the present invention are known to a person skilled in the art and are disclosed, for example, in U.S. Pat. No. 6,884,851. Due to the above described preferred definitions for the polyolefin (A) and compound (G), the component a) according to the present invention is most preferably a polypropylene or polyethylene, which is grafted with maleic anhydride.

The component b), which is used for obtaining the polymer (P1), is at least one compound (B) containing at least two epoxy groups. Such compounds are known to a person skilled in the art and are described, for example, in US-A 2004/0138381 or WO 00/26286. Component b)/compound (B) may be considered as having the function of a chain extender in respect of component (a). The compound (B) according to the present invention may be a polymer or oligomer itself under the provision that—after the compound (B) is produced, for example, by polymerization—said compound (B) still contains at least two epoxy groups.

Preferably, the compound (B) of component b) is a polymerization product of
b1) at least one epoxy-functional (meth)acrylic monomer and
b2) at least one styrenic and/or (meth)acrylic monomer.

Examples of such polymerization products containing at least two epoxy groups to be employed as component b) are styrene (meth)acrylic copolymers having at least two epoxy groups produced from monomers (according to component b1) and b2)) of at least one epoxy-functional (meth)acrylic monomer and at least one non-functional styrenic and/or (meth)acrylic monomer.

As used herein, the term (meth)acrylic monomer includes both acrylic and methacrylic monomers and relates to the corresponding esters (acrylate and methacrylate) of acrylic or methacrylic acid such as methyl acrylate and methyl methacrylate. Suitable acrylic and methacrylic monomers (to be employed as component b1)—irrespective of the epoxy functionality—or as component b2)) for use in the context in this invention include, but are not limited to, methyl acrylate, ethyl acrylate, n-propyl acrylate, n-butyl acrylate, n-hexyl acrylate, n-octyl acrylate, cyclohexyl acrylate, isobornyl acrylate, methyl methacrylate, ethyl methacrylate, n-propyl methacrylate, n-butyl methacrylate iso-butyl methacrylate, methylcyclohexyl methacrylate and isobornyl methacrylate.

Examples of epoxy-functional (meth)acrylic monomers for use in the present invention as component b1), therefore, include, but are not limited to, those containing 1,2-epoxy groups such as glycidyl acrylate and glycidyl methacrylate.

Other suitable epoxy-functional monomers include allyl glycidyl ether, glycidyl ethacrylate, and glycidyl itoconate.

Styrenic monomers for use in the present invention as component b2) include, but are not limited to, styrene, alpha-methyl styrene, vinyl toluene, p-methyl styrene, t-butyl styrene, o-chlorostyrene, vinyl pyridine, and mixtures of these species. In certain embodiments the styrenic monomers for use in the present invention are styrene and alpha-methyl styrene.

Preferred monomers according to component b2) are styrene, alpha-methyl styrene and non-functional acrylate or non-functional methacrylate monomers selected from methyl acrylate, n-butyl acrylate, n-hexyl acrylate, cyclohexyl acrylate, isobornyl acrylate methyl methacrylate, n-butyl methacrylate, iso-butyl methacrylate, cyclohexyl methacrylate, and isobornyl methacrylate and combinations thereof.

Preferably, the compound (B) according to the above definition has an epoxy equivalent weight (EEW-value) of from about 180 to about 2800 [g/mol], an Efn value of less than about 30, an Efw value of up to about 140, an $M_w$ value of less than 25000 [g/mol], and an $M_n$ value of less than 6000 [g/mol]. Efn means the number average epoxy functionality (per polymer chain), Efw means the weight average epoxy functionality (per polymer chain), $M_w$ means weight average molecular weight and $M_n$ means the number average molecular weight. Said values as well as methods for determining said values are known to a skilled person and are described, for example, in US-A 2004/138381.

Most preferably, the compound (B) containing at least two epoxy groups according to component b) of the present invention is a polymerization product of at least one monomer selected from glycidyl acrylate and glycidyl methacrylate and at least one monomer selected from styrene, methyl acrylate, n-butyl acrylate, n-hexyl acrylate, and methyl methacrylate.

An example of a preferred compound (B) containing at least two epoxy groups, and which is commercially available, is the Joncryl ADR series, such as Joncryl® ADR4368-CS (BASF SE, Ludwigshafen, Germany).

In a preferred embodiment of the present invention, the polymer (P1) is obtainable by a reaction of the component a) and b), wherein component a) reacts via a functional group selected form acid anhydride (—CO—O—CO—), —COOH, —OH or a salt thereof with an epoxy group of compound (B) to obtain the polymer (P1). The term "salt thereof" only relates to the functional groups —COOH and —OH. A suitable salt is, for example, the corresponding Na-salt such as —COO$^-$Na$^+$. Since compound (B) contains at least two epoxy groups, it is preferred that at least two of those epoxy groups are reacted with component a), preferably with two individual polymers falling under the definition of compound a).

In another preferred embodiment of the present invention, said reaction is carried out in absence of any radical formers (free radical initiators), such as peroxides and/or any perchlorates.

Another subject of the present invention is a composition containing at least one polymer (P1) according to the above definitions and at least one further polymer (P2). The polymer (P2) may be any polymer known to a person skilled in the art, which does not fall under the above definitions of polymer (P1). Preferably, the polymer (P2) is a polyolefin (C). The polyolefin (C) may have the same or a different definition compared to the polyolefin (A) according to component a) of polymer (P1). This means that the polyolefin (C) is preferably not grafted. More preferably, the polyolefin (C) has the same definition as polyolefin (A) according to component a) of polymer (P1).

Even more preferably, the polyolefin (C) is selected from polypropylene (PP), PP-copolymers, polyethylene (PE), or metallocene based polyolefins. Polyethylene is preferably low density polyethylene (LDPE), linear low density polyethylene (LLDPE), or high density polyethylene (HDPE). The PP copolymer and the metallocene based polyolefins are based on the same monomers as described above in connection with polyolefin (A). Most preferably, the polyolefin (C) of component a) is polypropylene (PP) or polyethylene (PE).

The composition according to the present invention may contain at least one polymer (P1) and at least one further polymer (P2) in any suitable ratio known to a person skilled in the art. Preferably, the composition contains 0.2 to 10 wt.-%, more preferably 1 to 5 wt.-%, of polymer (P1) related to the amount of polymer (P2).

The composition according to the present invention may contain besides at least one polymer (P1) and at least one further polymer (P2) further components, which are known to a person skilled in the art. In case the composition contains further components, said components are preferably selected from stabilizers, antioxidants, UV-absorbers, metal deactivators, metal quenchers, phosphites, hydroxylamines, nucleating agents, fillers, reinforcing agents, plasticizers, lubricants, emulsifiers, pigments, catalysts, flow promotors, optical brighteners or antistatic agents, wherein the amount of said further components is 0.1 to 50 wt.-% related to the sum of polymers (P1) and (P2). A preferred filler is a mineral filler, more preferably talcum. A preferred reinforcing agent are glass fibers.

Preferably, the composition according to the present invention is a processed composition, preferably the processed composition is a composition, which is compounded and afterwards optionally converted. The processing of the composition, in particular the compounding, is preferably carried out, by extrusion. The processing steps such as compounding or conversion are described in more detail below in connection with the process for producing polymer (P1) or the composition containing at least one polymer (P1) and at least one further polymer (P2).

In a preferred embodiment of the present invention, the composition contains
i) at least one polymer (P1) obtainable by reaction of
   a) at least one polyolefin (A) selected from polypropylene (PP), PP-copolymers, low density polyethylene (LDPE), linear low density polyethylene (LLDPE), high density polyethylene (HDPE) or metallocene based polyolefins,
      which polyolefin (A) is grafted with at least one compound (G) selected from acrylic acid, methyacrylic acid, maleic acid, fumaric acid, itaconic acid, crotonic acid, citraconic acid, maleic anhydride, itaconic anhydride, crotonic anhydride or citraconic anhydride, with
   b) at least one compound (B) containing at least two epoxy groups, wherein the compound (B) is a polymerization product of
      b1) at least one epoxy-functional (meth)acrylic monomer and
      b2) at least one styrenic and/or (meth)acrylic monomer,
ii) at least one further polymer (P2), which is a polyolefin (C) selected from polypropylene (PP), PP-copolymers, low density polyethylene (LDPE), linear low density polyethylene (LLDPE), high density polyethylene (HDPE) or metallocene based polyolefins.

Preferably, said composition is a processed composition, preferably the processed composition is a composition, which is compounded and afterwards optionally converted.

The processing of the composition, in particular the compounding, is preferably carried out by extrusion. Said composition may optionally contain further components, preferably talcum.

Another subject of the present invention is a process for producing a polymer (P1) according to the above definitions and a process for producing a composition according to the above definitions containing at least one polymer (P1) and at least one further polymer (P2).

Processes for producing a polymer (P1) are known to a person skilled in the art. The polymer (P1) may be obtained in the presence or absence of any further polymers, such as polymer (P2). In case the polymer (P1) should be obtained in isolated form, which means without the presence of any further polymers, component a) according to the above definitions is reacted with component b) according to the above definitions by methods known to a person skilled in the art. Preferably, said reaction is carried out in absence of any radical formers (free radical initiators), such as peroxides and/or any perchlorates. The obtained polymer (P1) may be processed, preferably compounded and afterwards optionally converted in the presence or absence of any further polymers, such as polymer (P2).

However, in case the polymer (P1) is produced in the presence of a further polymer, a composition according to the present invention is obtained, which composition contains at least one polymer (P1) and at least one further polymer (P2). It is preferred to carry out the reaction for producing polymer (P1) in the presence of at least one further polymer (P2) in order to obtain said composition. However, it is also possible to obtain a composition according to the present invention by preparing at least one polymer (P1) and at least one further polymer (P2) separately and mixing said polymers after the respective production or polymerization process. Preferably, the production of said composition is carried out in absence of any radical formers (free radical initiators), such as peroxides and/or any perchlorates.

The compositions according to the present invention are preferably produced according to a process, wherein component a) and/or component b) according to the above definitions is dispersed in polymer (P2) prior to the production of polymer (P1).

It is even more preferred that the composition according to the present invention is processed, preferably compounded and afterwards optionally converted. Most preferably, the processing of the composition and the production of polymer (P1) is carried out simultaneously, in particular during the compounding step.

Processing of a composition is a technique, which is known to a person skilled in the art. Processing usually comprises the steps of compounding and afterwards optionally converting the compounded polymers. It is quite common that the polymers are obtained as resins and/or powder after carrying out the polymerization step. Processing means that granulates (due to the compounding step) or even specific products (items) such as a blown film or a plastic part (due to the optional conversion step afterwards) are made out of said resins or powders. The step of adding some additional compounds such as stabilizers or additives to the resin or powder is usually carried out together within the compounding step.

According to the present invention, the compounding (step) is preferably carried out by extrusion. The extrusion within the compounding step may be carried out with any extruder known to be useful by a person skilled in the art. The preferred type of extruder is a twin screw extruder, however, a single screw extruder with barrier elements is also possible. The extruded composition is preferably obtained as granulates.

Optionally, after the compounding step, a conversion step may be carried out with the compositions according to the present invention, which composition is preferably provided in the shape of (individual) granulates prior to the conversion step. Said conversion (step) can be carried out by any method known to a person skilled in the art in order to obtain specific products (items) such as a blown film or a plastic part. The conversion is preferably carried out by extrusion or injection moulding. The extrusion techniques within said step comprise film blowing, casting, extrusion blow moulding profile extrusion, sheet thermoforming, and sheet foaming.

In another embodiment of the present invention, the composition is produced by a process, wherein a mixture of polymer (P2) and component a) is processed, preferably compounded by extrusion and component b) is added during said processing of the mixture of polymer (P2) and component a) in order to produce polymer (P1), wherein components a) and b) have the above definitions.

Another subject of the present invention is the use of a polymer (P1) according to the above definitions to reduce the melt flow rate (MFR) in polymers, in particular in recycled polyolefins.

The invention is illustrated hereinafter by the examples.

EXAMPLE 1

In the following example, a polymer (P1) according to the present invention is prepared in the presence of one further polymer (P2). CO-PP relates to said polymer (P2), PRIEX25050 and PRIEX25090 relate to component a) and JoncrylADR4370-S relates to component b) according to the above definition. By consequence, PRIEX25095 and JoncrylADR4370-S are reacted to obtain polymer (P1). Said polymers or components are all commercially available and are specified as follows:

CO-PP: random PP (R520Y) from SK corporation

PRIEX25095 and PRIEX25050: polypropylene grafted with maleic anhydride (PP-g-MAH) from Addcomp Holland B.V. in The Netherlands. The two PRIEX polymers differ in respect of the amount of grafted maleic anhydride (PRIEX25095: 0.465%; PRIEX25050: 0.1%)

JoncrylADR4370S (BASF SE, Ludwigshafen, Germany): polymerization product of at least one epoxy-functional (meth)acrylic monomer and at least one styrenic monomer, which polymerization product contains at least two epoxy groups. JoncrylADR4370S has an EEW-value of 285 [g/mol] and a $M_w$-value of 6800 [g/mol].

TABLE 1 details on preparing a processed composition

| Step | Specification | Condition |
|---|---|---|
| 1 (Mixing) | Hand mixing (of the individual components of the samples) | Mixing for 2 min |
| 2 (Processing, here compounding only) | Twin-Screw Extruders Type: LTE-26-40 $\phi$ = 26 mm, L/D = 40 | Temperature: 224° C. (Die)-225° C.- 225° C.-225° C.- 225° C.-225° C.- 220° C.-220° C.- 175° C.-140° C.- Feeder * |

TABLE 1-continued details on preparing a processed composition

| Step | Specification | Condition |
|---|---|---|
| 3 (Drying) | Dehumidifier Oven | at 50° C. for 1-2 h (moisture <150 ppm) |

*) The mentioned temperatures are the temperature settings of the successive heating zones of the extruder, starting at the die (end of the extruder, where the composition leaves the extruder) to the zone immediately after feeder (this is the head of the extruder). The first zone, where the raw materials are dropped into the extruder, was not heated Concentration of the Samples:
 Sample 1: CO-PP (control)
 Sample 2: CO-PP+0.50% JoncrylADR4370S PRIEX25095+0.05%
 Sample 3: CO-PP+1.50% JoncrylADR4370S PRIEX25095+0.15%
 Sample 4: CO-PP+2.50% JoncrylADR4370S PRIEX25095+0.25%
 Sample 5: CO-PP+0.50% JoncrylADR4370S PRIEX25050+0.05%
 Sample 6: CO-PP+0.25% JoncrylADR4370S PRIEX25050+0.0125%
 Sample 7: CO-PP+0.25% JoncrylADR4370S PRIEX25050+0.025%
 Sample 8: CO-PP+0.25% JoncrylADR4370S PRIEX25050+0.01%
 Sample 9: CO-PP+0.10% JoncrylADR4370S PRIEX25050+0.01%

TABLE 2

Detail data for CO-PP

| Item | value | Unit | Test method |
|---|---|---|---|
| MFR | 1.8 | g/10 min | ASTM D1238 |
| VICAT test | 132 | ° C. | ASTM D1525 |
| HDT | 82 | ° C. | ASTM D648 |
| Tensile strength @ yield | 290 | Kg/cm$^2$ | ASTM D638 |
| Elongation | >500 | % | ASTM D638 |
| IZOD(notched, 23° C.) | 10 | Kg · cm/cm | ASTM D256 |

Melt Flowing Rate (MFR) Test:
 Test condition:
  Load: 2.16 kg, temperature: 230° C., die type: 8/2(length of 8 mm, diameter of 2 mm)
 Test Result according to table 3:

TABLE 3

| Sample | 1 | 2 | 3 | 4 |
|---|---|---|---|---|
| MFR Value (g/10 min) | 2.17 | 1.81 | 1.97 | 2.09 |

| Sample | 5 | 6 | 7 | 8 | 9 |
|---|---|---|---|---|---|
| MFR Value (g/10 min) | 1.74 | 1.84 | 1.70 | 1.72 | 1.69 |

The compositions containing a polymer (P1) according to the present invention show reduced MFR values compared to the control sample.

EXAMPLE 2

As shown in FIG. 1, the torque is measured as a function of time for two samples on a 15 cm$^3$ DSM Conical Twin-Screw Micro Compounder. The experimental conditions are as follows: screw speed: 80 rpm, processing temperature: 220° C., and total residence time in the extruder: 2 minutes. The samples are used without predrying.

The samples are: 1. PRIEX 15005 (reference: component a) only), and 2. PRIEX 15005 plus 0.6% of Joncryl ADR4368-CS (polymer (P1)).

Priex 15005 is a LDPE from Addcomp Holland B.V., on which 0.45% of maleic anhydride has been grafted. Joncryl® ADR 4368-CS (BASF SE, Ludwigshafen, Germany) is a polymerization product of at least one epoxy-functional (meth)acrylic monomer and at least one styrenic monomer, which polymerization product contains at least two epoxy groups. JoncrylADR4368-CS has an EEW-value of 285 [g/mol] and a $M_w$-value of 6800 [g/mol].

The two curves show that the addition of compound B) to a polymer according to component a) is increasing the torque quite strongly, which implies that the viscosity has increased accordingly.

The invention claimed is:

1. A composition, comprising: a polymer (P1) obtained by reacting a component a) with a component b); and a further polymer (P2), wherein:
 the component a) is at least one polyolefin (A), which is grafted with at least one compound (G), wherein the compound (G) is selected from the group consisting of acrylic acid, methacrylic acid, maleic acid, fumaric acid, itaconic acid, crotonic acid, citraconic acid, maleic anhydride, itaconic anhydride, crotonic anhydride, and citraconic anhydride;
 the component b) is at least one compound (B) comprising at least two epoxy groups; and
 the composition comprises 0.2 to 10 wt. % of the polymer (P1) relative to the amount of the further polymer (P2).

2. The composition according to claim 1, wherein the polymer (P2) is a polyolefin (C).

3. The composition according to claim 2, wherein the polyolefin (C) has the same definition as the polyolefin (A).

4. The composition according to claim 1, comprising 1 to 5 wt.-% of the polymer (P1) relative to the amount of the polymer (P2).

5. The composition according to claim 4, further comprising at least one further component selected from the group consisting of a stabilizer, an antioxidant, a UV-absorber, a metal deactivator, a metal quencher, a phosphite, a hydroxyamine, a nucleating agent, a filler, a reinforcing agent, a plasticizer, a lubricant, an emulsifier, a pigment, a catalyst, a flow promoter, an optical brightener, and an antistatic agent,
 wherein an amount of the at least one further component is 0.1 to 50 wt.-% relative to a sum of the amount of the polymer (P1) and the amount of the polymer (P2).

6. The composition according claim 1, which is a processed composition.

7. The composition according to claim 6, wherein the processed composition is a composition which is compounded and then optionally converted.

8. A process for producing the composition of claim 1, the process comprising reacting the component a) with the component b).

9. The process according to claim 8, wherein the reaction occurs in the presence of the further polymer (P2).

10. A process for producing the composition of claim 1, the process comprising mixing the polymer (P1) with the further polymer (P2).

11. A process for producing the composition of claim 1, the process comprising dispersing the component a) or the component b) in the polymer (P2) prior to production of the polymer (P1).

12. The process according to claim 10, wherein the composition is processed.

13. The process according to claim 12, wherein processing of the composition and production of the polymer (P1) occur simultaneously.

14. The process according to claim 13, which occurs during compounding.

15. The process according to claim 14, wherein the compounding occurs by extrusion.

16. A process for producing the composition of claim 1, the process comprising adding the component b) to a mixture of the polymer (P2) and the component a) to produce the polymer (P1).

17. The process according to claim 16, wherein the addition occurs as a compounding by extrusion.

18. A method for reducing the melt flow rate (MFR) of a subject polymer, the method comprising combining the composition of claim 1 with the subject polymer.

19. The method according to claim 18, wherein the subject polymer is a recycled polyolefin.

20. The composition according to claim 1, wherein:
the polyolefin (A) is selected from the group consisting of a polypropylene, a polypropylene copolymer, a polyethylene, and a metallocene-based polyolefin;
or
the compound (G) is selected from the group consisting of acrylic acid, methacrylic acid, maleic acid, fumaric acid, itaconic acid, crotonic acid, citraconic acid, maleic anhydride, itaconic anhydride, crotonic anhydride, and citraconic anhydride.

21. The composition according to claim 20, wherein the polyolefin (A) is selected from the group consisting of a low density polyethylene, and a high density polyethylene.

22. The composition according to claim 1, wherein the compound (B) is a polymerization product of:
b1) an epoxy-functional (meth)acrylic monomer; and
b2) at least one of a styrenic monomer and a (meth)acrylic monomer.

23. The composition according to claim 1, wherein:
the polymer (P1) is obtained by reacting a functional group of the component a) with an epoxy group of the compound b); and
the functional group is selected from the group consisting of an acid anhydride group (—CO—O—CO—), a carboxylic acid group (—COOH), a hydroxy group (—OH), and a salt thereof.

* * * * *